May 12, 1959 R. F. BUTTLES 2,886,339
COLLAPSIBLE CARGO CARRYING DOLLY
Filed May 13, 1957
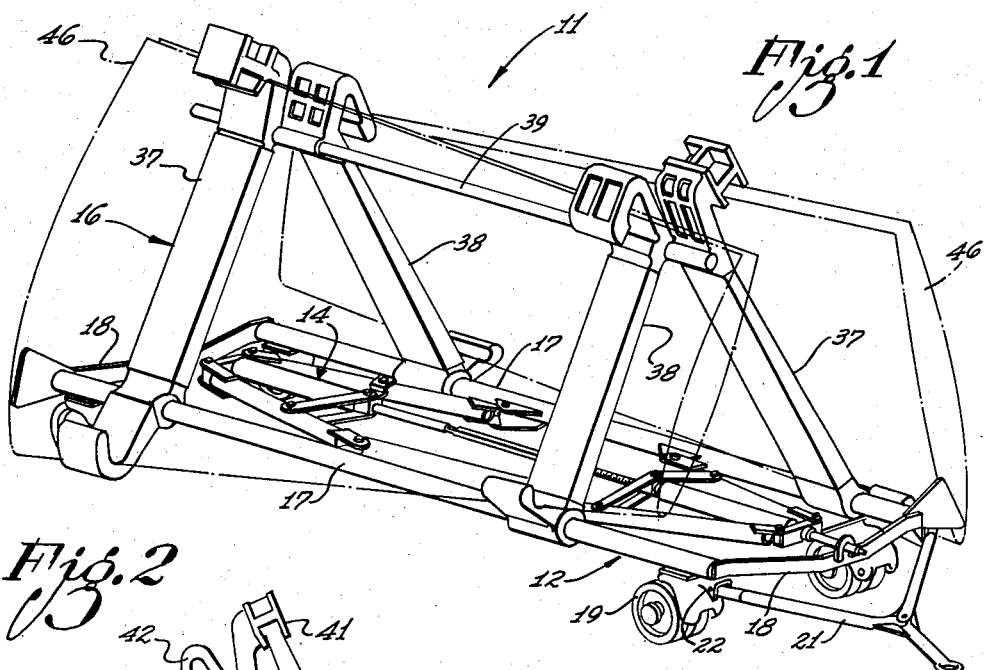
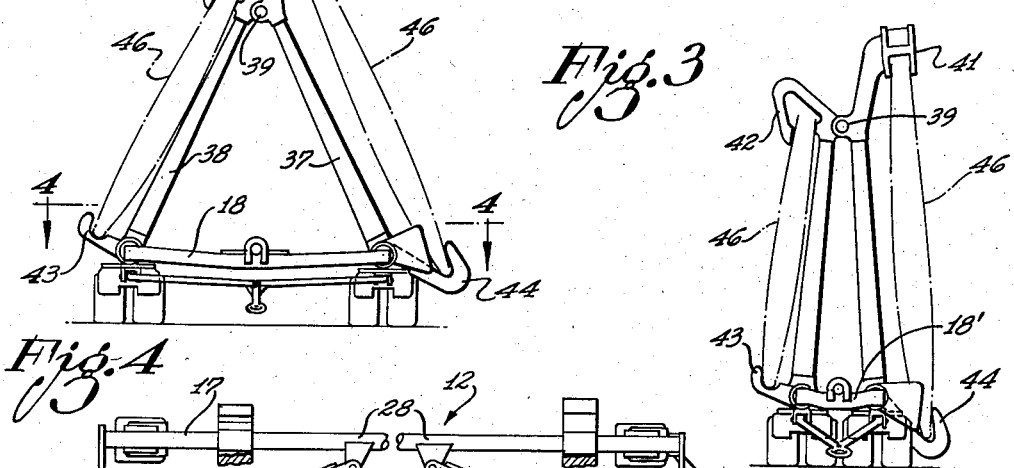
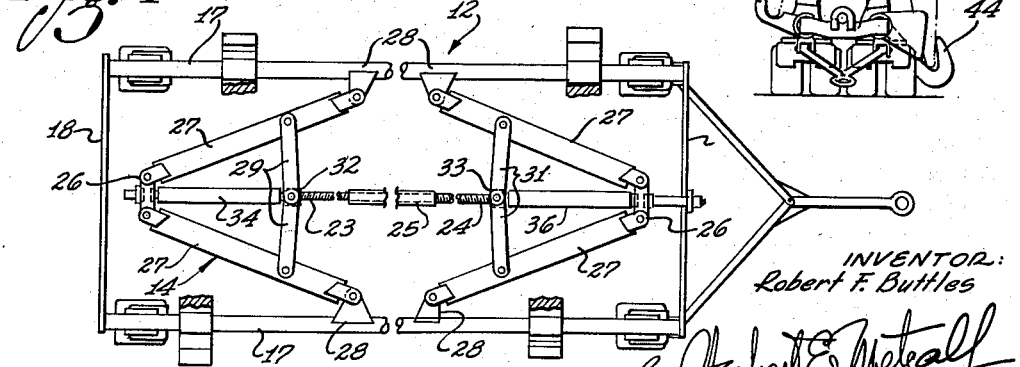
INVENTOR:
Robert F. Buttles
By Herbert E. Metcalf
His Patent Attorney

United States Patent Office 2,886,339
Patented May 12, 1959

2,886,339

COLLAPSIBLE CARGO CARRYING DOLLY

Robert F. Buttles, Torrance, Calif., assignor to Northrop Aircraft Inc., Hawthorne, Calif., a corporation of California Application May 13, 1957, Serial No. 658,809

2 Claims. (Cl. 280—42)

This invention relates to material handling equipment and more particularly to a cargo handling dolly adapted to be partially collapsed to facilitate the storage or transportation thereof.

Under certain conditions it is quite convenient and expedient to load a dolly having cargo mounted thereon, on a transportation facility for transfer from one point to another. The above statement is particularly true in connection with air transportation and especially so in the defense services when aircraft components and the like are urgently needed at a forward base.

Conventional type dollies, however, which are of sufficient size to accommodate major aircraft components, assemblies, and the like are too large to be accommodated in the fuselage of most present day aircraft. Accordingly the present invention proposes a dolly which may be collapsed in a direction to materially reduce its lateral dimensions. The subject dolly is further characterized by including two sets of cargo supporting arms, each set comprising a pair of cargo supporting arms. Corresponding ends of each set of arms are pivotally mounted on respective side members of the base structure of the dolly while their other ends are pivotally secured together. Thus, as the dolly is collapsed in a lateral direction the arms and cargo secured thereto are automatically positioned in a more advantageous position for storage or shipping as will become apparent as the disclosure progresses.

Accordingly it is an object of the present invention to provide a cargo handling dolly which may be collapsed in a lateral direction to facilitate the storing or shipping thereof.

Another object is to provide a collapsible cargo handling dolly in which the various components thereof and cargo mounted thereon are automatically moved to more advantageous positions as the dolly is collapsed.

Another object is to provide a cargo handling dolly the overall height of which may be substantially reduced at such time as cargo is not loaded thereon.

Another object is to provide a collapsible cargo handling dolly which is simple in design and rugged in construction, which is economical to manufacture, and which is easily adapted to various applications.

For a better understanding of the invention, and of the objects and advantages thereof, reference will be had to the following description and accompanying drawings, and to the appended claims in which the various novel features of the invention are more particularly set forth.

In the accompanying drawings:

Figure 1 is a perspective view of a cargo handling dolly as disclosed herein.

Figures 2 and 3 are elevational views of the forward end of the dolly shown in Figure 1 in the normal and collapsed positions thereof, respectively.

Figure 4 is a sectional view of the dolly as viewed along the lines 4—4 of Figure 2.

Referring to the drawing, Figure 1 shows a dolly 11 of the type as disclosed herein. The dolly 11 includes a base structure 12, a linkage and actuation assembly 14, and a cargo support assembly 16.

The base structure 12 includes a pair of side members 17—17 which are fabricated from aluminum or steel tubing or the like according to strength and weight requirements of the dolly 11. The members 17 are normally retained in fixed spaced parallel relation by means of spreader bars 18—18. The bars 18 are secured to the ends of the members 17 by quick release means such as thumb screws or the like (not shown). Caster type wheel assemblies 19 are secured to the members 17 adjacent their respective ends to render the dolly mobile. A tow bar 21 is releasably attached to brackets 22, the latter being fixedly secured to the under side of the forward ends of the members 17 substantially as shown in Figure 1.

The members 17 may be moved laterally with respect to each other, that is between positions corresponding to the normal and collapsed positions of the dolly 11 as shown in Figures 2 and 3, respectively, by means of the linkage and actuation assembly 14. The assembly 14 consists of a pair of screw members 23 and 24 having right and left-hand threads formed thereon, respectively, or vice versa. The screw members 23 and 24 are retained in axial alignment by a tube 25 which in the present embodiment is square in cross-section. The inner ends of the members 23 and 24 are square in cross-section and are slidably received in the tube 25, the latter allows relative longitudinal movement between the members 23 and 24 during actuation of the assembly 14. The outer ends of the members 23 and 24 are of plain cylindrical configuration and provide bearing surfaces for a pair of outer cross members 26—26. The extreme outer end of the member 24 extends beyond the forward spreader bar 18 and is either of square or hexagon configuration to receive a ratchet, speed wrench or the like.

The members 26—26 may be mounted on bearings (not shown) surrounding the members 23 and 24 and in any event are retained from longitudinal movement thereon by conventional means (not shown). A plurality of link members 27 extend between the outer ends of the members 26 and bracket-like members 28 which extend inboard from the side members 17 substantially as shown in Figure 4. It will be noticed that the members 27 are pivotally attached at each end to respective ones of the members 26 and brackets 28. Straps 29 and 31 extend between the members 23 and 24, respectively, and intermediate portions of the members 27 substantially as shown in Figure 4. The straps 29 are pivotally attached to a nut 32, the threads of which mate with the threads on the member 23, and are also pivotally attached to the aft members 27. Likewise the straps 31 are pivotally attached to a nut 33, the threads of which mate with the threads on the member 24, and are also pivotally attached to the forward members 27.

Sleeve members 34 and 36 are mounted in surrounding relation on the threaded members 23 and 24, respectively. As mounted the members 34 and 36 are fixedly secured to respective cross-members 26 which precludes longitudinal movement thereof as the members 23 and 24 are rotated. As the linkage assembly 14 is actuated, by turning the member 24 in a direction to position the dolly 11 in its normal or fully expanded attitude, the nut members 32 and 33 are bottomed on the respective inner ends of the sleeve members 34 and 36. At this time the straps 29—29 and 31—31 assume substantially a straight line configuration in plan as viewed in Figure 4 and the dolly is rendered extremely rigid.

At such times as it is desired to collapse the dolly 11, for transportation purposes or the like, the fore and aft spreader bars 18—18 and the tow bar 21 are removed from the dolly. The member 24 is now rotated in a direction to collapse the trailer. Rotational movement of the member 24 is imparted to the member 23 through the tube member 25. Accordingly the same rotational movement is imparted to the member 23 and the side members 17 are moved toward each other in parallel relation. After sufficient inboard movement has been imparted to the side members 17 shorter spreader bars 18'—18', as shown in Figure 3, and a new tow bar (not shown) are attached to the dolly, thus the dolly is rendered rigid in its collapsed attitude.

The dolly construction is completed by the aforementioned cargo support assembly 16. This assembly consists of two main support members 37—37 and two minor support members 38—38. The respective lower ends of one of the members 37 and one of the members 38 are pivotally mounted on the right-hand side member 17, likewise the lower ends of the other members 37 and 38 are similarly pivotally mounted on the left-hand side member 17. The upper ends of the members 37 and 38 are all connected together for free pivotal movement on a longitudinally extending rod member 39 which may be removed from the assembly 16 when desired. The extreme ends of the members 37 and 38 extend outwardly of the members 17 and 39 and are provided with attach fittings 41–44, inclusive, which in the present embodiment are designed to receive a pair of aircraft wings 46.

As best seen in Figure 1 the major support members 37—37 are mounted diagonally on the base structure 12 with respect to each other, likewise the minor support members 38—38 have a diagonal relationship as mounted on the base structure 12. This construction permits the wings 46—46 to be mounted on the dolly 11 in a reverse relationship which results in a partial nesting or overlapping of the wing ends and, therefore, a saving of space. By referring to Figures 1 and 4 it will also be noted that support members 37 and 38, mounted on the right-hand side member 17, are staggered with respect to the support members mounted on the left-hand side member 17. Thus with the rod member 39 removed from the upper ends of the members 37 and 38, and with the dolly in its normal attitude as shown in Figure 2, the support members may be pivotally moved to a substantially horizontal position without interfering with each other. The support members 37 and 38 are placed in the above substantially horizontal position at such times as the dolly 11 is to be transported without cargo being loaded thereon. This feature results in a great savings spacewise at such time as the dolly is to be shipped without components being loaded thereon.

The various component parts of the dolly 11 having been described in detail a better and more complete understanding of the novel features of the dolly will be forthcoming from the following description of its operation.

With the dolly in its normal or fully expanded attitude, as shown in Figures 1 and 2, the pair of wing panels 46—46 are positioned on the support members 37 and 38 substantially as shown. At this time the spreader bars 18 are secured in position on the ends of the side members 17—17 and, therefore, the dolly is rendered extremely rigid for transportation on the assemblies 19.

Assuming now that the dolly plus its cargo is to be loaded in the fuselage of an aircraft for transportation purposes. The spreader bars 18—18 and tow bar 21 are first removed. The linkage assembly 14 is then actuated to move the dolly to its collapsed attitude as shown in Figure 3. This is accomplished by rotating the threaded member 24 in the correct direction which movement is also imparted to the member 23 through the tubular member 25. It will be noticed, by referring to Figures 2 and 3, that lines joining the pivotal axes of the members 37 and 38 on the side members 17—17 and on the rod member 39 define an isosceles triangle. This relationship is maintained as the dolly is moved between its normal and collapsed attitudes. Thus with the dolly in its collapsed attitude, the wing panels 46—46 are positioned in substantially parallel side by side relation in which the dolly and wing panels occupy a minimum of space as best seen in Figure 3.

With the dolly in its collapsed attitude it may now be positioned in the fuselage of an aircraft or the like and in this attitude will occupy a minimum of space. The shorter spreader bars 18' are now secured to the ends of the side members 17—17 to render the dolly rigid during the transportation thereof. The dolly may also be secured to the deck of the conveying vehicle by suitable securing means (not shown).

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A collapsible cargo carrying dolly, comprising: a base structure mounted on wheel assemblies; said base structure including a pair of spaced laterally opposed side members; a linkage and actuating assembly pivotally attached to said side members adapted to maintain the relatively relation of said side members and impart relative bidirectional lateral movement therebetween; a first pair of elongated cargo receiving arm members extending above said base structure and having first ends thereof pivotally mounted on one of said side members; a second pair of elongated cargo receiving arm members extending above said base structure and having first ends thereof pivotally mounted on the other one of said side members; elongated means and the other ends of said first and second pairs of arm members being attached to said elongated means for pivotal movement thereon.

2. A dolly as set forth in claim 1: further characterized in that said first and second pairs of arm members are mounted in staggered longitudinal relation on said pair of side members and said elongated means is releasably attached to and may be removed from the other ends of said side members.

References Cited in the file of this patent

UNITED STATES PATENTS

| Number | Name | Date |
|---|---|---|
| 595,150 | Crowley | Dec. 7, 1897 |
| 1,359,032 | Cole | Nov. 16, 1920 |
| 1,784,240 | Lynds | Dec. 9, 1930 |
| 2,159,672 | Owen | May 23, 1939 |
| 2,397,317 | Hulbert | Mar. 26, 1946 |
| 2,466,149 | Burg | Apr. 5, 1949 |